July 20, 1971
R. C. CARLSON
3,594,313
LIQUID PURIFICATION SYSTEM WITH ZETA-POTENTIAL
CONTROL OF CHEMICAL ADDITIVES
Filed April 13, 1970
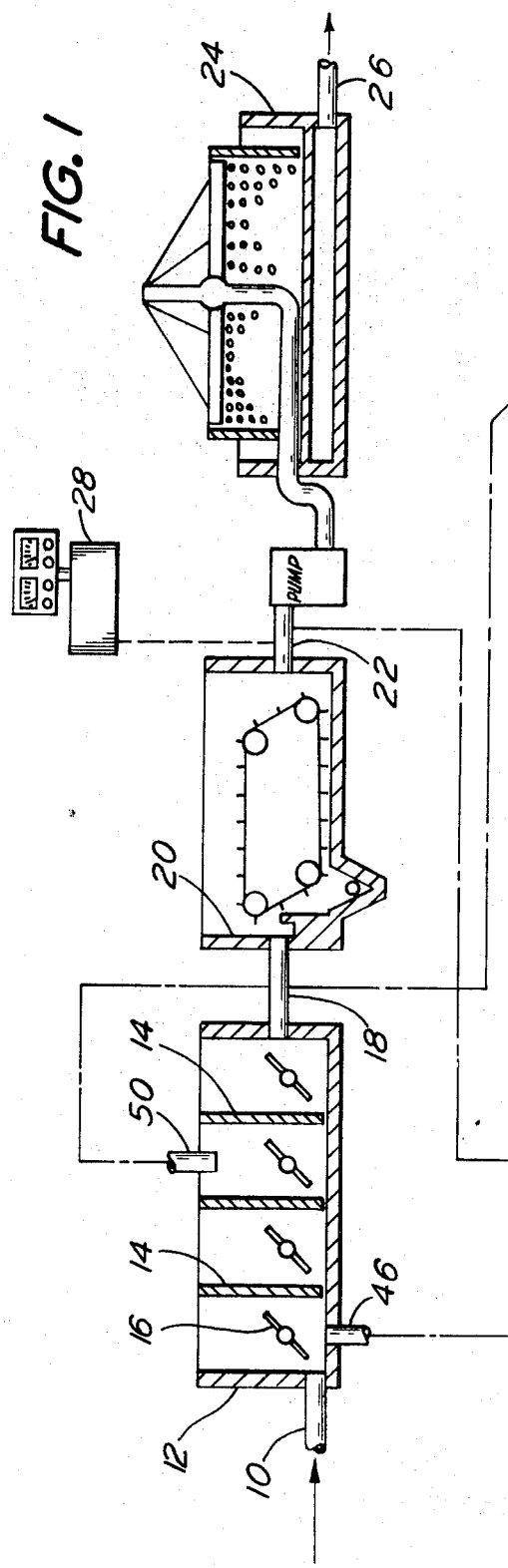
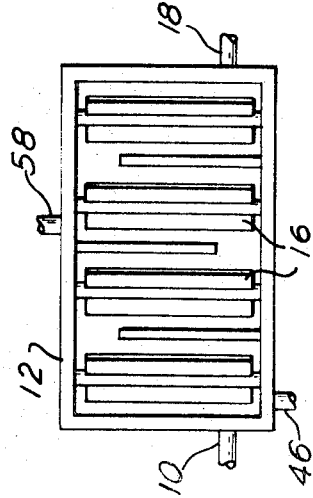
INVENTOR
ROLF C. CARLSON
BY
ATTORNEY

United States Patent Office 3,594,313
Patented July 20, 1971

3,594,313
LIQUID PURIFICATION SYSTEM WITH ZETA-POTENTIAL CONTROL OF CHEMICAL ADDITIVES
Rolf C. Carlson, Levittown, Pa., assignor to International Waterpure Corporation, Fallsington, Pa.
Filed Apr. 13, 1970, Ser. No. 27,807
Int. Cl. C02b 1/20
U.S. Cl. 210—18
9 Claims

ABSTRACT OF THE DISCLOSURE

An anti-pollution system for flowing liquids which is particularly adapted to the treatment of flowing aqueous systems polluted with sewage, industrial wastes, or the like. The system is especially adapted to remove colloids from the liquid by causing flocculation and coagulation of the colloids. This is accomplished by controlling the zeta-potential of the liquid at the initial stages in such a manner that flocculation and coagulation of the colloids is substantially effected at that point. After a zeta-potential value is determined and obtained by the insertion of chemical additives, the subsequent flow of the liquid is scanned by an automatic control unit which adjusts the amount and rate of insertion of the chemical additives at the initial stages in accordance with any variation of the zeta-potential from a predetermined value.

---

This invention relates to an anti-pollution system for flowing liquids, and it particularly relates to the treatment of aqueous systems polluted with sewage, industrial wastes or the like.

One of the primary problems of modern society is the purification of liquid systems to reduce or eliminate pollutants therein. Many different types of treatment have heretofore been effected, some more satisfactory than others. However, it has not, heretofore, been possible to provide an effective treatment without the use of elaborate, complex and expensive systems which necessitate the utilization of a great deal of equipment and a large tract of land which could otherwise be used for more desirable purposes.

The treatment of waste from a domestic sewage or industrial source must be processed to comply with the local regulations on pollution handed down by the several states and generally monitored by the federal government. Although the regulations vary somewhat, the "rule of thumb" used throughout the country is to provide an 85% removal of BOD (biological oxygen demand).

Oxygen is nature's greatest purifier. In sewage it keeps the aerobic bacteria active. These aerobic bacteria feed on the organic wastes and, thereby, act as waste-removers. The amount of oxygen needed to keep a sufficient amount of aerobic bacteria in the sewage is the aforesaid BOD (biological oxygen demand). Therefore, the greater the organic pollution the higher the requirement of BOD removal, and, consequently, the greater is the consumption of DO (dissolved oxygen) which is vital to the survival of aquatic life and to the maintenance of a high-quality water supply.

The conventional treatment plant generally costs from about $350,000–$400,000 per 1,000,000 g.p.d. flow, and requires about one acre of land per 1,000,000 g.p.d. Whereas a medium-sized plant will have a capacity of 10 MM g.p.d. (10 acres and $3.5 MM), many exceed 50 MM g.p.d. Consequently, when a new installation is being proposed, it is obvious that a great deal of capital and land must be obtained, both of which are expensive in today's economy.

The conventional sewage disposal plant generally comprises preliminary coarse screening and grit collection chambers, several primary settlement tanks arranged in such a manner as to accommodate a flow at a predetermined rate for a predetermined retention time, a secondary treatment apparatus which comprises a trickling filter or aeration lagoon where bacterial action, through oxidation, is supposed to consume most of the organic wastes, and one or more secondary settling tanks from which the effluent is finally discharged to a stream. In some instances, primary and secondary flocculating chambers are provided, one before the primary settling tanks and one before the secondary settling tanks. The sludge removed from the primary and secondary settling tanks goes to an activated sludge system, a contact-stabilization system or combination of both, or an anaerobic digester for further treatment and disposal.

Regardless of what system or combination of systems is used to achieve the end result, however, the entire process has only one objective: Removal of the particulate matter that is contained in the water. This is composed of suspended solids, dissolved solids, and those colloids that contribute to color, odor, and taste. Any and all of these are subject to precipitation and/or floatation and removal from the aqueous medium by appropriate physiochemical means. Therefore, it seems reasonable that if the maximum amount of matter is removed in the primary stage, the load would be considerably reduced in the succeeding operations which could even be eliminated altogether. Such reduction of treating stages would result in a tremendous saving in money and land requirements, as well as operating personnel. However, this cannot be done with simple sedimentation, no matter what the size of the primary treatment area is, because some colloids will remain in suspension indefinitely. Nor can it be done with the ordinary inorganic chemical treatment which, when at all successful, will settle out only the heavier solids. In this respect, it is generally a relatively simple matter to remove the bulk of the solids, but the remaining portion which includes the colloids, is much more difficult to remove and provides the basic problem in the purification process.

It is, therefore, one object of the present invention to increase the unit capacity of waste-disposal plants while simultaneously reducing the physical sizes, number of treatment units, and amount of land required.

Another object of the present invention is to significantly reduce the overall treatment costs while producing a higher-quality liquid by removing the maximum amount of pollutants in the primary stages of treatment.

Another object of the present invention is to remove troublesome colloids in the initial treatment stages and to use polyelectrolyte flocculants and coagulants under automatically controlled conditions, whereby it is possible for a waste-disposal plant to operate under optimum conditions and at maximum efficiency at all times.

Another object of the present invention is to provide for effective removal of colloids in a single operation.

Other objects and many of the attendant advantages of this invention will be readily appreciated as the same becomes better understood by reference to the following description when read in conjunction with the accompanying drawing wherein:

FIG. 1 is a schematic view of a system embodying the present invention.

FIG. 2 is a top plan view of the flocculating chamber.

The primary treatment section, which is used to remove the bulk of the solids, generally occupies only a relatively small proportion of the total plant cost and area. In accordance with the present invention, the removal capacity of this primary treatment section is significantly increased and the cost and size of the remaining plant is thereby significantly reduced without increasing the physical size of the primary treatment area. This is effected by removal of the troublesome colloids, normally present in the primary effluent, prior to discharge of the effluent to the biological or secondary treatment. This takes advantage of the fact that it is the volume of the effluent, not the settled solids, that contributes to the undesirable enormity of the plant size.

It is generally known that all colloidal particles in an aqueous medium usually possess a negative charge or zeta-potential (ZP). This ZP, through the action of like charge repulsion, keeps the colloidal particles apart in aqueous dispersion and inhibits any settling. If this ZP could be neutralized and brought to the zero flocculation point, the natural Van Der Waals' forces would be overcome, flocs of higher density would be formed and then these flocs could be easily coagulated and then precipitated in the first stage, without any subsequent treatment. With the proper selection of inorganic chemicals and/or organic long-chain polymers, the optimum ZP can be obtained for flocculation and, secondarily, coagulation. This process is applicable regardless of particle size.

After optimum conditions in a treatment have been established, if they are subsequently upset, it is apparent that if the major parameters, such as ZP, ph, flow, conductivity, colorimetry, and turbidity, are being monitored, appropriate changes in the chemical feed system can be made to return to optimum conditions. However, this optimum condition may exist only for an instant. Heretofore, these changes could only be made periodically, leaving the system out of control for the vast majority of the time.

To maintain peak efficiencies at all times, only three factors need to be automated; namely, ZP, ph, and flow. If this is done, then the other factors will be automatically reduced in significance. As ph is a relatively simple control situation, it remains to control the ZP and to have the chemical feed system react properly to flow changes. Therefore, in accordance with the present invention, a control system is provided wherein a sensing or monitoring device, standardized and calibrated by the so-called "Zeta-Meter," continuously samples and transmits the colloid charge density to a controller which, when certain pre-set ranges are exceeded, will signal chemical feed pumps to alter the flow rate of one or more chemicals to bring the ZP back into an acceptable range. Once the subject variables are under complete control, maximum efficiency in colloid removal is achieved on a continuous basis.

The "Zeta-Meter" is a standard, commercially-available instrument which is sold by Zeta-Meter, Inc., of New York, N.Y., and is used to evaluate the zeta-potential (ZP) of a discrete sample taken from the system. The "Zeta-Meter," itself, cannot be used in an automatic system since it involves manual handling and evaluation of the discrete sample of the liquid. However, it is an integral part of the total process herein described since it is used to evaluate the desired zeta-potential and thereby, permits calibration of the automatic system. This "Zeta-Meter" device is described in the Zeta-Meter, Inc., "Catalog No. 5," which is incorporated herein by reference.

The evaluation of the zeta-potential involves the determination of the average electrokinetic charge and what charge will be necessary to obtain the desired system stabilization at an optimum level. This desired end result may be either flocculation, coagulation, filtration, dispersion, or stabilization. The zeta-potential and desired end result are the determining factors as are the general category of additive chemicals to choose for obtaining the desired stabilization. This may involve the use of organic or inorganic cationic electrolytes including inorganics such as $FeCl_3$, alum, etc., and synthetic organic polyelectrolytes, which may be either cationic, anionic or nonionic polymers of varying chain length. The organic polyelectrolytes include, among many other polymers, the cationic polyethyleneimines and the nonionic or anionic polyacrylamides; the latter being especially adapted for chemical "bridging" between particles. The particular polyelectrolytes used are a matter of choice and feasibility and, by themselves, form no part of the present invention, except as used in the process.

Once the category is established the "Zeta-Meter" can help establish what materials to use. The cationic materials act to reduce the negative zeta-potential to the zero floc point for maximum flocculation, and the long chain polyelectrolytes, such as the polyacrylamides, will coagulate the formed floc for rapid settling.

After the test sample has been evaluated by the "Zeta-Meter," and the system has been manually adjusted with chemicals, based on the readings of the "Zeta-Meter," to the optimum zeta-potential, the water is passed through a streaming current detector where continuous readings are taken. These readings then become the zeta-potential control of the system with a built-in minimum and maximum range to avoid constant hunting on a control unit, hereinafter described, which is connected to the detector. This control unit records the measurements of the detector and, when a predetermined minimum or maximum ZP value is recorded, the control unit automatically operates the flow rate of two or more pumps operatively connected thereto. These pumps are respectively connected either to a source of cationic material which is used to decrease the negative ZP value or to a source of anionic material which is used to increase the negative ZP value.

A built-in "dead band" range in the control unit prevents any "hunting" sequence and permits a predetermined allowable zeta-potential fluctuation in the system. Beyond this range, an increase in negative zeta-potential will cause the control unit to change the flow rate of one pump, and a decrease in negative zeta-potential will change the flow rate of the other pump. In actuality, both pumps may be arranged to change their flow rates simultaneously whereby, as one may be increased or decreased, the other will respond inversely.

In summary, the "Zeta-Meter" measures the zeta-potential or charge on the particulate matter in the system, helps select the appropriate chemicals to achieve a predetermined ionic stability, and determines the amount and type of additives necessary to achieve optimum results. The automatic system is then calibrated on the basis of these values and takes over from that point.

Because the "Zeta-Meter" cannot be used to sample continuously from the system, the detector unit, which has this sampling capability, is calibrated to give readings equal to those on the "Zeter-Meter." Any significant change in this reading caused by changes in the pollutants content of the liquid can be corrected by electronic impulses controlling an appropriate chemical feed pump.

In the ordinary system, the liquid passes through a plurality of consecutively arranged clarifying chambers. These are open basins where the liquid is caused to remain for lengthy periods ranging from 2 to 4 hours or more, while the solids are allowed to settle. The liquid is then pumped to a secondary system for aeration and biological oxidation, after which it passes to additional clarifiers.

The necessity for using the many clarifiers in the above-described system is due to the inability of such system to effectively flocculate and coagulate the colloids so that they may be removed by precipitation at the same time that the other solids are removed.

In the present system, the polluted water enters the purification system and, generally, first flows through a grit chamber (not shown) where large particles of grit, stone, etc., are removed. The use of the grit chamber is standard and forms no part of the present invention.

The water than usually flows through a comminuting chamber (not shown) where paper, rags, etc. are ground up and removed. This chamber, too, forms no part of the present invention.

From the comminuting chamber, the water flows through conduit 10 into a flocculation chamber 12. This flocculation chamber 12 comprises an open tank divided into a plurality of bays by baffles 14. The baffles are alternately spaced at one end from the adjacent wall of the tank, one alternate set of baffles being spaced from one wall and the adjacent baffles being spaced from the opposite wall so that a tortuous path is provided for the flow of the water.

Each bay is equipped with mixing paddles 16 having peripheral speeds that decrease uniformly from about 1.2 ft./sec. in the first bay to about 0.6 ft./sec. in the last bay. These paddles create impingements of sewage solids to build up "floc."

The water, containing the "floc," is then passed through a conduit 18 into a "clarifying" or settling chamber 20. Here the "floc" is allowed to settle or precipitate and the precipitate is removed. The clarified water is then passed through conduit 22 into an aeration chamber 24 for oxidation and bacterial action, if necessary, whereby aerobic bacteria feed on and dispose of the organic wastes remaining in the water. The purified water then flows into the stream through conduit 26.

As the polluted water passes from the clarifying chamber 20, a sample is taken and tested for zeta-potential (ZP). This test is conducted by means of the aforesaid "Zeta-Meter," which is indicated at 28. The "Zeta-Meter" determines the electrophoretic mobility (EM) of the colloids suspended in the liquid. From the EM value, the ZP of the particles can be readily calculated with a chart, based on the simple Helmholtz-Smoluchowski equation. The "Zeta-Meter," itself, comprises an electrophoresis cell, a mirrored cell-base and holder, a jack-knife type cell illuminator, a variable voltage D.C. power unit equipped with a precision voltmeter, a triple-shunted microammeter, a power outlet for the cell illuminator, an electric timer, and a modified sterioscopic microscope.

After the ZP is determined, the sample is treated by the addition of certain additives until the ZP is corrected to the zero floc point for maximum flocculation. In aqueous systems, this ZP is generally negative and the additives used are cationic in nature. Such additives may include inorganc electrolytes such as ferric chloride, alum, or the like, or synthetic organic polymers such as polyethylenimine. Long chain organic polyelectrolytes, such as long chain polyacrylamides, are also preferably added to form bridges whereby the formed floc is coagulated for rapid settling.

Based upon the information obtained by the "Zeta-Meter," the particular type and amount of additives are permitted to flow, at a predetermined amount and rate, into the flocculation chamber 12. These additives, both flocculating agents and polyelectrolyte bridging agents, regulates the flocculation and coagulation action in chamber 12, by means of maintaining the value of the zeta-potential within a predetermined range, whereby the resultant particles, after entering the clarifier chamber, are precipitated out and removed together with the other solids.

Interposed in the outlet line 22 is a streaming current detector 30 which serves to scan the liquid flowing from the chamber 20 to detect any significant change in the ZP of the material in chamber 12. The detector 30 is, preferably, a commercially-available instrument called the "Hydroscan," which is manufactured by the Leeds & Northrup Company. This instrument includes two main elements, a probe assembly and an indicator. The probe assembly comprises (a) a closed-end cylinder and electrodes, (b) a piston, (c) a synchronous motor, (d) a bi-metal cam, (e) a read switch, (f) a solid state amplifier, (g) a power supply, and (h) a stainless steel shield having opposed parts to permit passage therethrough of the liquid. The indicator is a zero-center microammeter with a scale reading from —10 to 0 to +10 in arbitrary units, and attenuator selection buttons. The electrical output from the indicator is fed, as a measured signal, into the control unit hereinafter described. This "Hydroscan" unit is not further illustrated or described herein since it is a commercially-available unit, and by itself, forms no part of the present invention except as used in the present system. The "Hydroscan" unit is described in Leeds & Northrup Company's data sheet entitled "L&N Hydroscan Streaming-Current Detector," and identified as "Data Sheet D2.5001—1969." This data sheet is incorporated herein by reference.

In operation, as the liquid flows through the "Hydroscan" unit, the charged colloidal particles distribute themselves on the surfaces of the piston and cylinder bore. The synchronous motor drives the piston, which reciprocates at 4-hertz in the closed-end cylinder. The piston is loosely fitted within the cylinder, and its up-and-down motion generates a laminar flow between the piston and the cylinder wall which shears the counter-ions from the immobilized, adsorbed particles. Silver electrodes positioned at the ends of the cylinder detect the flow of counter-ions moving at a constant frequency in the annular region.

The 4-hertz streaming current generated in the above manner is amplified, the input to the amplifier is capacitively coupled to provide noise discrimination, and the output is transformer-coupled to achieve isolation. A magnet and a bimetal cam coupled to the piston drive operates a reed switch which functions in a demodulator to rectify the 4-hertz current. The D-C output signal represents the average charge density. The signal is attenuated and is displayed by the zero-center microammeter.

By means of the above-described "Hydroscan" unit, if there is any significant change in the ZP of the liquid in chamber 20, this is recorded by the "Hydroscan 30" which, thereupon, actuates the control unit 32. This, in turn, actuates a pump system, hereinafter described, to vary the respective amounts of additives flowing into the chamber 12.

The control unit 32 also comprises a commercially-available type of standard equipment in the form of a system sold by Leeds & Northamp and designated "P.A.T. Controller." This system comprises (a) a primary element sensitive to the variable quantity to be controlled, (b) a recorder or indicator that measures the output of the primary element and that includes a control setting device which signals the controller whenever the controlled variable departs from the control set point, (c) a controller which automatically produces a drive unit position responding to the input requirements of the controlled process and which is provided with proportional, reset, rate, and approach actions to adjust for the proper response of the control valves for the pump units, (d) an electric drive unit which turns in either direction in response to controller signals and which is mechanically coupled to the final control element, and (e) a control valve assembly which serves as the final control element.

The above-indicated "P.A.T. Controller" is described in a Leeds & Northrup publication entitled "Series 80–3– Action P.A.T. Controller, Directions-177529, Series 1," said publication being incorporated herein by reference.

The "P.A.T. Controller" 32 is operatively connected to a pump control means 34 which selectively actuates at least two pumps 36 and 38. These pumps are respectively connected to corresponding sources of additives (not shown) through respective conduits 40 and 42. The pump 36 is connected by conduit 44 to an inlet 46 in chamber 12 for inserting cationic material, while the pump 38 is connected by conduit 48 to an inlet 50 in chamber 12 for insertion of anionic material.

Any feasible control means which can selectively operate the pumps 36 and 38, in accordance with signals from the "P.A.T. Controller," may be used. In the present instance, it is preferred to use a commercially-available assembly sold by Leeds & Northrup and described in a Leeds & Northrup publication entitled "10675 Sequence Control Units; 177554, Issue 1." This publication is incorporated herein by reference.

The aforesaid "10675 Sequence Control Unit" drives a crank arm connected to the piston of one pump to the limit of its travel in one direction and the drive is then automatically transferred to a crank arm connected to the piston of the other pump. The electrical point at which transfer takes place is adjustable. The stroke of the pumps may, thereby be varied or entirely cut off by movement of the "Sequence Control Unit." It is sometimes desirable that the transfer of the drive from one pump to the other takes place before complete cut-off of the pump controlling either additive, so that there is always some of both additives being passed into the flocculation chamber 12.

The pumps may be of any desirable and feasible type. One such type of pump is that produced by the MR Company, Philadelphia, Pa., under the name "Milroyal Controlled Volume Pumps." This is described in that company's Bulletin No. 35,001, dated July 1965, and incorporated herein by reference.

The above-indicated detector, control and pump-operating mechanisms are not necessarily limited to the particular commercially-available units disclosed herein. These units are specific exemplifications of such mechanisms, but any other mechanisms that would perform the same functions may be substituted. In other words, the present invention lies not in any of the particular equipment used but in the general combination forming the complete system for regulating the zeta-potential at the initial treating stage.

The invention claimed is:

1. A method of removing colloidal particles from a flowing body of liquid which comprises passing the entire body of liquid through a flow path, determining the zeta-potential of said liquid, adjusting said zeta-potential to a predetermined value sufficient to cause flocculation and coagulation of colloidal particles in said liquid, continuously scanning the ionic charge in the entire body of liquid by measuring the ionic charge in the flowing body of liquid itself without removing any of the liquid from the flowing body of liquid as it passes from one end to the other of said flow path through a predetermined position in said flow path to continuously determine variations in the zeta-potential of the liquid at said position, and maintaining a substantially constant zeta-potential value of said liquid by continuously adding varying proportions of chemical additives to said liquid in accordance with variations of said zeta-potential as determined by said scanning.

2. The method of claim 1 wherein said liquid is passed through a liquid purification system that includes a flocculation chamber and a clarifier chamber adjacent the initial portion of said system, said predetermined position being adjacent said clarifier chamber.

3. The method of claim 1 wherein said liquid is water.

4. The method of claim 1 wherein said chemical additives comprise ionic inorganic, and organic compounds.

5. The method of claim 1 wherein said liquid then flows through an aeration area for oxidation thereof.

6. The method of claim 1 wherein at least some of each additive continues to flow at all times.

7. A liquid purification system comprising a flocculation chamber, a clarifier chamber, and an aeration area in fluid connection with each other to form a path of flow of the entire body of liquid, fluid inlet means in said flocculation chamber, said inlet means being in fluid connection with corresponding sources of zeta-potential controlling chemical additives, means to vary the relative amounts and rates of flow of said additives into said flocculation chamber, a scanning device interposed in said path of flow between said clarifier chamber and said aeration area, said scanning device being constructed and arranged to measure the zeta-potential of the entire body of liquid without removing any of the liquid from the flowing body of liquid as said entire body of liquid flows from said clarifier chamber past said scanning device into said aeration area by measuring the ionic charge therein and to actuate a control means when said zeta-potential varies from a predetermined value, said control means being operatively connected to at least one source of said additives and being constructed and arranged to vary the rate and amount of flow of said additives from said source in accordance with the measurements determined by said scanning device.

8. The system of claim 7 wherein said control means comprises an electrical control unit electrically connected to said scanning device, at least one pump operatively connected to said control unit, said control unit being constructed and arranged to vary the stroke of the pump piston in accordance with electrical signals received from said scanning device, said pump being also operatively connected between said fluid inlet means and said source of additives.

9. The system of claim 8 wherein there are at least two sources of additives, each being operatively connected to a pump and a control valve.

References Cited

UNITED STATES PATENTS 3,386,911  6/1968  Albertson _____ 210—18
3,399,133  8/1968  Gerdes et al. _____ 210—42
3,441,956  4/1969  Farnham _____ 210—53

OTHER REFERENCES

Riddick, T. M., Zeta Potential and its Application To Difficult Waters, Jour. AWWA, August 1961, vol. 53, pp. 1007–1030.

MICHAEL ROGERS, Primary Examiner

U.S. Cl. X.R.

210—96, 202, 206